United States Patent Office 2,770,660
Patented Nov. 13, 1956

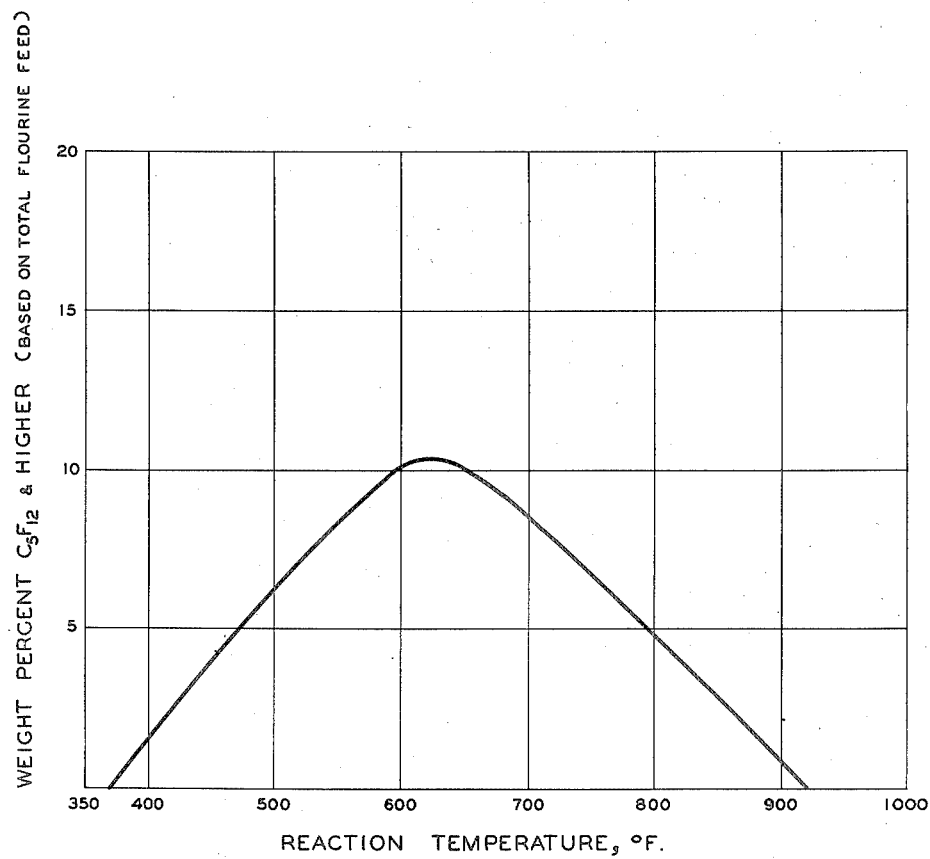

2,770,660

METHOD OF PRODUCING FLUOROCARBONS

Herbert J. Passino, Englewood, Wilber O. Teeters, River Edge, and Russell M. Mantell, Orange, N. J., assignors to The M. W. Kellogg Company, Jersey City, N. J., a corporation of Delaware Application February 11, 1952, Serial No. 271,016

9 Claims. (Cl. 260—653)

This invention relates to an improved process for the reaction between carbon and fluorine, and more particularly pertains to the reaction between carbon and fluorine by means of a fluid system for the production of normally liquid products.

The reaction between carbon and fluorine proceeds at a fast rate with the accompaniment of unusual exothermic effects. It is necessary to exercise control over the reaction, otherwise there is a danger of losing appreciable quantities of the fluorocarbons which are formed and of causing injury to equipment parts through corrosion, etc. As a result of the heat liberated, there is a strong tendency for local overheating to occur in small regions of the reaction zone, thus causing the development of "hot spots." The difficulties mentioned above have retarded the exploitation on a commercial scale of the carbon-fluorine reaction. The fluorocarbons are useful for many purposes, such as for example, additives in lubricating oils, blending agents in fuels, transformer liquids, solvents, etc.; thus it is important to furnish a method whereby such compounds can be produced in an effective and economical manner.

It is an object of the present invention to provide an improved process for reacting carbon and fluorine.

Another object of this invention is to provide a fluid system for the reaction of carbon and fluorine.

Still another object of the present invention is to provide an improved process for reacting carbon and fluorine to obtain substantial amounts of fluorocarbons having at least 5 carbon atoms in the molecule.

Other objects and advantages of this invention will become apparent from the following description and explanations thereof.

In accordance with the present invention, fluorocarbons are prepared by the method which comprises reacting fluorine with a fluid mass of finely divided carbon particles, in the presence of an inorganic metal halide, and under suitable conditions of temperature and pressure, and more particularly by the method involving the use of at least about 8% by weight of an inorganic metal halide for the intended reaction.

Another aspect of the invention involves obtaining substantial amounts of fluorocarbons containing at least 5 carbon atoms in the molecule by the method which comprises reacting fluorine with a fluid mass of finely divided carbon particles, in the presence of an inorganic metal halide, and at a temperature of about 375° to about 925° F.

The use of the fluid system for reacting carbon and fluorine results in an effectively controlled reaction and the production of substantial amounts of fluorocarbons in comparison with any other type of non-fluid system. The fluid system is obtained by passing the reactant fluorine gas through a mass of finely divided carbon particles at a rate sufficient to cause fluidization of the carbon particles. Generally, the fluorine may be sufficient to effect fluidization, however, under some circumstances the fluorine rate desired may be unusually low, thus an inert gas is also employed to insure proper fluidization. In practice, fluidization is effected by passing gaseous materials upwardly through a mass of finely divided carbon particles at a superficial linear gas velocity of about 0.1 to 50 feet per second, more usually about 0.1 to about 6 feet per second, and preferably about 1.0 to about 2.5 feet per second. At such velocities, a fluid bed of carbon particles is formed which is capable of exerting a fluistatic pressure, flowing, etc., much in the same manner as a liquid. Such a fluid bed can be either a lean or dense phase, although a dense phase is preferred because of the better control of reaction conditions which is possible thereby. A fluid system is obtained by employing finely divided carbon having a particle size of about 5 to about 250 microns, or more usually about 10 to about 100 microns. The size and density of the particles will determine the superficial linear gas velocity to be employed for a given purpose. Large and dense particles require higher gas velocities than smaller and less dense carbon particles.

A non-fluid system for reacting carbon with fluorine in the presence of an inorganic metal halide is difficult to control satisfactorily. There is a pronounced tendency for local overheating to occur in the reaction zone, which causes many operating difficulties. Such types of systems are usually not adequate to cope with the heat problem, which requires rapid dissipation or flow of heat from one part of the reaction zone to another in order to establish a substantially uniform temperature in the carbon bed, and hence avoid the development of "hot spots." A fluid system is unique for the carbon-fluorine reaction because the particles in the fluid bed are in a random, turbulent, circulatory motion, which makes possible rapid mixing of the carbon particles throughout the reaction zone. This characteristic of a fluid system is unusually adapted for overcoming the serious heat problem which exists in a carbon-fluorine reaction. Another interesting consideration is that a fluid system also makes possible the production of substantially more fluorocarbons than was possible heretofore by non-fluid methods.

In reacting fluorine and carbon, generally, about .001 cubic feet to about 1.00 cubic feet, preferably about .010 cubic feet to about 0.10 feet, of fluorine (measured at 60° F. and 760 mm.) per minute per pound of carbon are used. Although not essential, it is contemplated using about zero cubic feet to about 10 cubic feet, preferably about 0.10 cubic feet to about 1.00 cubic feet (cubic feet are measured at 60° F. and 760 mm.) of inert gas per minute per pound of carbon in order to insure proper fluidization of the carbon particles when employing exceptionally low quantities of fluorine and/or for purposes of heat control. By using the inert gas, it is possible to employ very high ratios of carbon to fluorine gas in the reaction and still have a fluid system. In practice, the rate of fluorine gas is regulated in order to maintain a desired production of fluorocarbons, temperature of reaction, etc. It is also contemplated that the inert gas be used as a cooling medium, in situations where the fluorine rate is sufficient to effect proper fluidization, but too high to obtain adequate heat control without some other means for cooling. The inert gas which can be used for the purpose of this invention includes nitrogen, argon, neon, tetrafluoromethane, etc. The inert gas should be preferably a material of high specific heat and one which is substantially inert under reaction conditions. The heat property of the inert gas is important, because it makes possible the use of relatively smaller quantities for cooling the reaction to the desired temperature. When an inert gas is used, the ratio of inert gas to fluorine is about 1:1 to about 100:1, preferably about 10:1 to about 50:1.

The carbon reactant for this invention can be any material which furnishes carbon under reaction conditions and is substantially free of hydrogen. Ordinarily, the carbon can be used in the form of wood, charcoal, sugar charcoal, graphite, coke, etc. Materials which contain substantially all carbon are found to be especially suitable for the reaction, because there is less of a tendency for side reactions to occur. Furthermore, in the reaction between carbon and fluorine, reactions other than those between carbon and fluorine are to be avoided, because it presents problems of separation, etc., not to mention the loss of valuable reactant materials in producing undesirable products. For purposes of this invention, it is preferred to use a wood charcoal material, because of the excellent results which are obtained.

The temperature at which carbon and fluorine are reacted is determined on the basis of the type of products sought. Generally, this reaction can be conducted at a temperature in the range of about 200° to about 1100° F. Over the temperature range indicated, there may be or may not be produced fluorocarbons containing at least 5 carbon atoms in the molecule. With respect to those fluorocarbons, it is found that the reaction between carbon and fluorine should be conducted at a temperature range of about 375° to about 925° F., otherwise there is little or no formation of such materials. For the temperatures specified above, the reaction is carried out at sub-atmospheric, atmospheric or super-atmospheric pressures. Usually it is found that pressures in the range of about 0.5 to 10 atmospheres, preferably about 1 to 3 atmospheres, are satisfactory for the intended reaction.

Carbon and fluorine may be reacted without the use of catalytic material, however, it is found that the yield of products thus produced is very small in comparison with an operation requiring the use of a catalytic material. For the present invention, the catalytic material includes an inorganic metal halide, such as the inorganic metal fluorides, chlorides, bromides and iodides. Satisfactory catalyst for this reaction are, for example, the halides of copper, silver and gold in group IB; the halides of zinc, cadmium and mercury in group II; and the halides of iron, cobalt and nickel in group VIII having an atomic number not greater than 28. More specific illustrations of catalytic materials are mercuric chloride, cobalt chloride, silver chloride, cupric chloride, zinc chloride, copper bromide, zinc bromide, mercuric bromide, etc. The amount of catalytic material employed for the reaction is measured on the basis of the weight of carbon which is present in the system. Ordinarily, small amounts of catalytic material in the order of at least about 0.1% by weight are found useful for the reaction. Although generally, the catalytic material can be used in the amount of up to 20%. When using a catalyst, there is a noticeable improvement in the yields of fluorocarbons over those reactions which are conducted without a catalytic material. Concentrations of at least about 8% of the catalyst and up to about 12% by weight are preferred for this reaction. Higher concentrations than just mentioned tend to cause the deposition of catalytic material on the walls of the reaction vessel. It was observed when using an inorganic metal chloride as a catalyst that the product obtained may contain a chlorofluorocarbon as well as fluorocarbons. Specifically, the use of mercuric chloride in the reaction between carbon and fluorine resulted in the production of some trifluorochloromethane in the product material. This phenomenon appears to indicate that perhaps the inorganic metal halide does not function as a catalyst, but instead serves as a moderator for the reaction, by furnishing halogen in a suitable form. Notwithstanding, for the purpose of this invention and the appended claims, it is intended to refer to the inorganic metal halides as catalysts.

In order to provide a better understanding of the present invention, specific examples are given below. However, it should be understood that no undue limitations or restrictions are to be imposed by reason thereof.

Experiments were conducted on a laboratory scale in order to evaluate the conditions under which the reaction between carbon and fluorine should be conducted. The apparatus employed for this purpose consisted of a Monel reactor having approximately a 1 inch diameter and being about 36 inches long. A small settling chamber, 6 inches in length and approximately 4 inches in diameter, was superimposed on the reactor tube and contained a cylindrical porous sintered Monel filter for the removal of entrained carbon particles from the effluent gaseous material. The filter was about 4 inches long and about 2 inches in diameter. Concentrically, disposed within the filter was a Monel thermowell connected to the lower end of the filter by means of a sliding friction sleeve. This thermowell was approximately ¼ inch in diameter and 34 inches in length. The thermowell contained a sliding iron-constantan thermocouple which was 36 inches in length. Within the bottom of the reactor there was provided a support consisting of a Monel ring, upon which there rested a Monel tube having the outside diameter slightly smaller than the internal diameter of the reactor and having a length of 1 inch, which was filled with a roll of 100 mesh nickel gauze. The nickel gauze permitted gases to pass therethrough and distribute evenly across the cross-sectional area of the reactor and it provided a means of supporting the carbon particles in the reactor. There was also resting on the support, a ¼" x 4" friction-fitted Monel sleeve bearing three projections for concentric spacing. The bottom end of the thermowell fitted into the Monel sleeve and was thereby centered within the reactor. The filter situated within the settling chamber communicated by means of external connection to a Pyrex internal cold-finger liquid nitrogen trap having a 4 inch diameter and a 20 inch length. The liquid nitrogen trap was connected to a Pyrex graduated Podbielniak distillation kettle of a 50 mm. capacity. The kettle was maintained in a cooled condition by immersion in a Dewar flask containing liquid nitrogen. Heat was supplied to the reaction by external means through a 2500 watt electric jacket surrounding the same. Flourine and inert gas were supplied to the bottom of the reactor by means of lines which were connected to suitable rotometers for measuring the rates of the feed gases. At the top of the reactor there was installed a suitable gauge for measuring the reaction pressure.

In Table I below, there is reported the results obtained in the equipment described above. In this table, the effect of temperature on the yield of fluorocarbons containing at least 5 carbon atoms is demonstrated.

Table 1

| Ex. No. | $F_2$ rate, ft.³/min. | Total $F_2$ Charged, gms. | $N_2$ rate, ft.³/min. | Type of Carbon | Carbon charge, gms. | Catalyst | Catalyst, gms. | Temperature, °F. (Ave.) | $C_5F_{12}$ and higher, gms. | Weight percent of $C_5F_{12}$ and higher (Based on total fluorine feed) |
|---|---|---|---|---|---|---|---|---|---|---|
| 1 | .00371 | 25 | .0371 | Norite [1] | 50 | $HgCl_2$ | 0.5 (Dry Ground).[3] | 680 | 2 | 8 |
| 2 | .0175 | 275 | .02 | do | 50 | $HgCl_2$ | do | 888 | 7 | 2.55 |
| 3 | .0025 | 35 | .02 | Norite [2] | 50 | $HgCl_2$ | 4 (Wet impregnated).[4] | 375 | nil | nil |
| 4 | .0025 | 38 | .02 | do | 50 | $HgCl_2$ | do | 625 | 4.0 | 10.5 |

[1] Wood pine charcoal of 40–200 mesh size.
[2] Wood pine charcoal of 40–100 mesh size.
[3] Catalyst ground to size and mixed with Norite.
[4] Aqueous solution of catalyst used to impregnate Norite and then dried.
Reaction pressure in all runs was 0 to 5 p. s. i. g.

The percent by weight of fluorocarbons containing at least five carbon atoms, based on the total charge of fluorine, was correlated against the reaction temperature. This relationship constitutes the figure of the attached drawing. It is to be noted that the reaction temperature should be in the range of about 375° to about 925° F., otherwise little or no fluorocarbons containing at least five carbon atoms are produced. It is unusual to note that the temperature has this effect notwithstanding differences in other conditions of the reaction.

Additional experiments were made to determine what effect, if any, catalyst concentration has on the production of fluorocarbons containing at least five carbon atoms in the molecule. These results are given in Table II below.

It is shown in Table II that the relative yields of fluorocarbons containing at least five carbon atoms compared to the production of lower molecular weight fluorocarbons are not substantial when using catalyst in the amount of from about 2 to about 8% by weight based on the carbon. However, when using a catalyst concentration of 8% by weight, there is greater selectivity for the production of fluorocarbons containing at least five carbon atoms. The selectivity for the production of such higher boiling fluorocarbons also exists for the run in which 10% by weight of catalyst was employed, although it took place to a lesser extent.

A comparison was made between a system employing a fluid technique and one in which a non-fluid or static bed of carbon was used. The results from this comparison are reported in Table III below.

Table II

| Ex. No. | Fluorine Rate, ft.³/min. | Nitrogen Rate, ft.³/min. | Carbon, 40–100 mesh, grams | Catalyst | Weight of Catalyst, grams | Temp. °F. (ave.) | Weight percent of $C_5F_{12}$ and higher (Output Basis) |
|---|---|---|---|---|---|---|---|
| 1 | 0.0175 | 0.02 | 50 | $HgCl_2$ | 1 | 663 | 0.4 |
| 2 | 0.0175 | 0.02 | 50 | $HgCl_2$ | 2 | 663 | 5.2 |
| 3 | 0.0175 | 0.02 | 50 | $HgCl_2$ | 3 | 663 | 5.2 |
| 4 | .0025 | 0.02 | 50 | $HgCl_2$ | 4 | 625 | 32.2 |
| 5 | .0050 | 0.02 | 50 | $HgCl_2$ | 5 | 475 | 19.2 |

Table III

| Ex. No. | Fluorine Rate, ft.³/min. | Nitrogen Rate, ft.³/min. | Carbon, 40–100 mesh, grams | Catalyst | Weight of Catalyst, grams | Temperature, °F. | Weight Percent of $C_5F_{12}$ and higher (Output Basis) |
|---|---|---|---|---|---|---|---|
| 1 | 0.0025 | .02 | 50 | $HgCl_2$ | 4 | 600–650 | 32.2 |
| 2 | 0.0025 | .02 | 50 | Hg/Ag [2] 3:1 | 4 | 600–650 | 27.3 |
| 3 [1] | | | | $HgCl_2$ | | | 18.2 |

[1] A static bed operation—the best results reported in the literature (J. A. C. S., vol. 61, p. 2962 (1939)
[2] $HgCl_2$ and AgF in a 3:1 weight ratio.

It is to be noted from Table III, that a catalyst involving a mixture of mercuric chloride and silver fluoride in ratio of 3:1 of the former to the latter is suitable for the selective production of fluorocarbons containing at least five carbon atoms. Furthermore, it is shown in Table III that the use of a static bed or a non-fluid operation results in substantially lower yields of fluorocarbons containing at least five carbon atoms. These data demonstrate the superiority of a fluid system on the basis of product distribution of fluorocarbons.

In another experiment, it was found that the use of mercuric chloride resulted in the formation of fluorochlorocarbons when reacting fluorine and carbon. This data is shown below in Table IV.

Table IV

| Temperature, °F. | Fluorine Rate, Ft.³/min. | Nitrogen Rate, ft.³/min. | Carbon, 40-100 mesh, grams | Catalyst | Weight of Catalyst, grams | Weight percent of $C_2F_6$ (Output Basis) | $CF_3Cl$—Mol percent of $C_2F_6$ fraction |
|---|---|---|---|---|---|---|---|
| 600-675 | 0.0175 | 0.02 | 50 | $HgCl_2$ | 4 | 8.3 | 11.5 |

It is unusual that trifluorochloromethane is produced during the reaction between carbon and fluorine, in the presence of mercuric chloride. This reaction is unexpected in view that it has been advanced by those skilled in the art that an inorganic metal halide serves as a catalyst in the reaction between fluorine and carbon. The presence of trifluorochloromethane in the product indicates that the inorganic metal halide does not function as a true catalyst since it is obviously consumed in the reaction, but perhaps acts as a moderator by supplying halogen other than fluorine in small amounts, which interrupts the free radical chain reaction of fluorine with carbon and so retards the overall reaction velocity.

Having thus described our invention by giving specific illustrations thereof, it should be understood that the scope should be measured by the following claims.

We claim:

1. A process which comprises reacting a fluidized mass of finely divided carbon particles with fluorine as substantially the sole halogen at a temperature of about 375° to about 925° F. in the presence of between 8 percent and 12 percent by weight of an inorganic metal halide.

2. The process of claim 1 wherein the inorganic metal halide is mercuric chloride.

3. A process which comprises reacting fluorine as substantially the sole halogen with a fluidized mass of finely divided carbon particles suspended in an inert gas at a temperature of about 375° to about 925° F. in the presence of between 8 percent and 12 percent by weight of an inorganic metal halide.

4. The process which comprises reacting a fluidized mass of finely divided carbon particles and fluorine as substantially the sole halogen at a temperature of about 375° to 925° F. in the presence of between 8 percent and 12 percent by weight of a group II metal halide.

5. The process of claim 4 wherein the group II metal halide is mercuric halide.

6. The process of claim 4 wherein the group II metal halide is mercuric chloride.

7. A process for producing fluorocarbons containing at least 5 carbon atoms which comprises reacting a fluidized mass of finely divided carbon particles suspended in an inert gas and fluorine as substantially the sole halogen at a temperature of about 375° to about 925° F. in the presence of between 8 and 12 percent by weight of a group II metal halide.

8. The process of claim 7 wherein the group II metal halide is mercuric halide.

9. The process of claim 7 wherein the group II metal halide is mercuric chloride.

References Cited in the file of this patent

UNITED STATES PATENTS

| 1,984,380 | Odell | Dec. 18, 1934 |
| 2,456,027 | Simons | Dec. 14, 1948 |
| 2,456,028 | Simons | Dec. 14, 1948 |
| 2,522,968 | Simons | Sept. 19, 1950 |
| 2,574,619 | Cady | Nov. 13, 1951 |

OTHER REFERENCES

Simons et al.: J. A. C. S. 61, pages 2962 to 2966.